United States Patent [19]
Schulhof et al.

[11] Patent Number: 5,572,442
[45] Date of Patent: Nov. 5, 1996

[54] SYSTEM FOR DISTRIBUTING SUBSCRIPTION AND ON-DEMAND AUDIO PROGRAMMING

[75] Inventors: Nathan Schulhof, Los Gatos; James M. Janky, Los Altos, both of Calif.

[73] Assignee: Information Highway Media Corporation, Cupertino, Calif.

[21] Appl. No.: 279,243

[22] Filed: Jul. 21, 1994

[51] Int. Cl.$^6$ ................................................. H04N 5/268
[52] U.S. Cl. ........................... 364/514 C; 348/6; 348/7; 455/4.2
[58] Field of Search ............................ 455/4.2, 3.2, 6.3; 348/6, 7; 369/30; 364/514 C, 401; 395/425

[56] References Cited

U.S. PATENT DOCUMENTS

| | | | |
|---|---|---|---|
| 4,455,651 | 6/1984 | Baran | 370/104 |
| 4,499,568 | 2/1985 | Gremillet | 369/30 |
| 4,725,977 | 2/1988 | Izumi et al. | 395/425 |
| 5,099,422 | 3/1992 | Foresman et al. | 364/401 |
| 5,181,107 | 1/1993 | Rhoades | 358/86 |
| 5,191,410 | 3/1993 | McCalley et al. | 358/86 |
| 5,247,347 | 9/1993 | Litteral et al. | 358/85 |
| 5,253,275 | 10/1993 | Yurt et al. | 375/240 |

OTHER PUBLICATIONS

Deloddere, Daniel et al., "Interactive Video On Demand", IEEE Communications Magazine, May 1994, pp. 82–88.
Jones, J. Richard, "Baseband and Passband Transport Systems for Interactive Video Services", IEEE Communications Magazine, May 1994, pp. 90–101.
Chang, Yee–Hsiang et al., "An Open Systems Approach to Video on Demand", IEEE Communications Magazine, May 1994, pp. 68–79.

*Primary Examiner*—Ellis B. Ramirez
*Assistant Examiner*—Thomas Peeso
*Attorney, Agent, or Firm*—Michael A. Glenn

[57] ABSTRACT

A distribution system for audio program materials includes a portable audio storage and retrieval device that is programmable from a high speed data transfer system, and that includes a high-capacity data storage medium, a base control interface for identifying and accepting program material, a mobile control interface for displaying the identity of recorded material for playback selection, a recording mechanism for accepting very high speed digital data from an external source at rates faster than real time, and a playback mechanism for retrieving the stored data from the storage medium and for converting the data into audio signals for playback.

9 Claims, 7 Drawing Sheets

5,572,442

SYSTEM FOR DISTRIBUTING SUBSCRIPTION AND ON-DEMAND AUDIO PROGRAMMING

BACKGROUND OF THE INVENTION

1. Technical Field

The invention relates to the distribution of subscription and on-demand audio program material. More particularly, the invention relates to high speed recording of audio program material from a remote source on a subscription and/or on-demand basis using a portable high capacity audio recording and playback device.

2. Description of the Prior Art

Although much neglected by the public and the press in connection with the current fascination with pay-for-view movies, video-on-demand, and other multimedia services, sound remains the most compelling and informative element in any form of interpersonal or electronic communication. To understand this concept better, consider a television network news broadcast. If the picture portion of the broadcast is lost, one is still able to receive most of the content of the broadcast. However, if the audio portion of the broadcast is lost, one receives almost none of the content of the broadcast.

Radio was the most highly successful entertainment medium until sound motion pictures and television added the visual element to entertainment programming. The state of radio today is such that it provides a source of music, as well as talk and news, especially for those environments that require some level of visual concentration, such as operating a vehicle or machinery, or working in an office. Thus, radio has been pushed into the background as an ancillary form of entertainment.

One can listen to a radio and hear whatever is being broadcast at the time; or one can record a desired piece of music or other program as it is broadcast, and listen to the recording later, for example on an automobile cassette player. One can also transport prerecorded audio program materials, such as tapes and compact disks, and listen to them in the car or on a portable playback device, such as a Walkman®. Prerecorded audio programming that is available includes music, books on tape, and various educational and entertainment materials.

All known audio program delivery methods have been generally accepted by the public, but they are somewhat limited in their appeal because they are time-consuming to prepare, for example making a recording for later use is time consuming because the recording must be made in real time. They are expensive, for example a compact disk containing a musical performance or a book on tape may only be listened to once or twice, although the full purchase price must be paid for such materials. And they do not offer the variety of program material that is either now available from television cable services, or that is available from other media, such as print media, for example the New York Times or the Wall St. Journal.

There are other significant limitations inherent in an off-the-air recording system that include a lack of control of the choice of program material, and the time at which the subscriber can listen to this material. In current radio broadcast systems, the program material is broadcast when the station manager thinks it best. Such real time distribution requires that interested listeners tune in at the designated time, assuming that the station is willing or able to publicize its broadcast schedule in advance of the broadcast. Even so, a listener must typically endure several annoying interruptions for commercial messages, even if listening to the so-called public radio stations. Prerecorded materials are packaged by the manufacturer and must be used in the format provided, i.e. all of the materials must be listened to in the order they were recorded. Otherwise, the consumer must prerecord the prerecorded materials to edit the content and/or order of the materials, as well as adding other materials that were not included by the manufacturer of the prerecorded programming. As discussed above, the recording process is time consuming, requires a certain level of patience and skill, and is a significant barrier to use for the typical listener. Thus, those persons listening to a broadcast while in their automobiles have less control because they cannot time shift a program by recording the program, although they may nevertheless want to listen to certain programs while traveling. Additionally, those persons listening in the automobiles may want to listen to program material that is not normally available on a public broadcast channel. While those persons listening in their automobiles may listen to recordings that they have purchased or recorded themselves when the program material was originally broadcast, the mobile listener cannot take control of the program selection process and the time at which the program is heard, nor can such materials be combined or edited without a significant commitment of the listener's time to assembling the desired materials, or portions of the desired materials, in the desired order.

The most limiting factor in the expansion of audio related news and entertainment services is probably the lack of program material having the form and content desired by the subscriber, coupled with the lack of a modern customer order and distribution system for such materials for conveniently delivering the program materials in the desired format.

The video-on-demand industry is just evolving. However, the video-on-demand industry has a fundamentally different focus than that of radio or other audio-based program delivery services, i.e. to duplicate a theater-like experience in the viewers home, not offer a commuter or other mobile listener an audio-on-demand or subscription service. The state of the art is therefore concerned with providing video services, not with informing a busy commuter during otherwise idle time spent in an automobile traveling to and from work.

For example, H. Brudner, Computer-Assisted Instruction Via Video Telephone, U.S. Pat. No. 3,654,708(26 May 1969) discloses a teaching system that uses a video telephone as a terminal. The video telephone is tied into a computer and information is fed into the video telephone, while other information is returned to the computer. A video tape recorder, containing a central bank of pre-recorded reels of video tape, is connected to the central processing unit of the computer and the video telephone, such that pictorial representations, as distinguished from the alpha-numerical representations, appear on the screen of the video telephone, enabling interaction with the student. The central bank of pre-recorded reels of video tape is connected to a buffer unit so that selected tape reels can be transfer recorded material into the buffer unit, where it is played back to the student selecting such tape. In this manner, the pre-recorded reels of video tape in the central bank are available almost simultaneously to a large number of students at different terminal units in the teaching system.

See, also, the following:

C. Coddington, J. Gold, D. Klika, D. Konkle, L. Litteral, J. McHenry, A. Richard III, PSTN Architecture For Video- On-Demand Services, U.S. Pat. No. 5,247,347 (27 Sep. 1991), which discloses a public switched telephone network (PSTN) that provides digital video signals from a video information provider to one or more of a plurality of subscriber premises. A subscriber uses either a standard telephone instrument over the PSTN or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse control channel from the subscriber to the central office for transmission on the ISDN packet data network back to the video information provider. The interfaces also allow base band signaling and audio between the central office and the subscriber for conventional telephone instrument connectivity;

J. Fischer, K. McCalley, S. Wilson, Interactive Multimedia Presentation And Communications System, U.S. Pat. No. 5,191,410 (2 Mar. 1993), which discloses a system for interactively and selectively communicating particular multimedia presentations to each of a plurality of subscribers along a CATV cable network. The subscriber communicates his selections, both for viewing particular presentations from a menu and for transactions with respect to the information and products being viewed, by entering codes on his Touch-Tone telephone pad. Subscriber input signals are communicated as digital signals through the intercommunications network and response signals are generated, ultimately as analog TV signals for viewing by the subscriber;

D. Rhoades, Telephone Access Information Service Distribution System, U.S. Pat. No. 5,181,107 (19 Jan. 1993), which discloses a digital, interactive communication system designed to provide a plurality of remote subscribers with any one of a variety of stored information service software packages through the use of a home computing assembly maintained within the subscriber's home and structured to display video as well as generating audio on a standard television receiver. A bi-directional communication link is established over telephone lines between the home computing assembly and a central remote information storage center so that a selected one of the variety of information services is transmitted as a modulated carrier to the subscriber. Information service selection is controlled by a remote information storage center executive software program. Automatic billing is performed by computing equipment maintained in the remote information storage center and transmitted to a headquarters which also receives diagnostic messages associated with the remote information center and/or the associated plurality of home computing elements; and D. Rhoades, Telephone Access Video Game Distribution Center, U.S. Pat. No. 5,051,822 (24 Sep. 1991), which discloses a digital, interactive communication system that is designed to provide a plurality of remote subscribers with any one of a plurality of stored video games or like software packages through the use of a home computing assembly maintained within the subscriber's home. The assembly is structured to display video as well as generating audio on a standard television receiver, and further incorporates the ability to use contemporary video gaming control devices for subscriber program interaction. A bi-directional communication link is established over the telephone lines between the home computing assembly and the central remote game storage center wherein the software programs are transmitted as a modulated carrier to the subscriber. Program selection is controlled by a remote game storage center executive software program. Automatic billing is performed by computing equipment maintained in the remote game storage center and transmitted to a headquarters which also receives diagnostic messages associated with the remote game center and/or the associated plurality of home computing elements. And, also Pocock et al, U.S. Pat. Nos. 4,734,764 and 5,014,125 (a system for conveys still frame video with overlaid graphics and audio to a CATV channel during the vertical blanking interval of a television signal, including subscriber control and selection of display material via operation of a touch tone pad on a telephone); McCalley et al, U.S. Pat. No. 4,829,372 (packet transmission of digital information to a subscriber via a dedicated line/converter); Abraham, U.S. Pat. Nos. 4,567,512 and 4,590,516 (telephone subscriber request and scheduling system); Harrison, U.S. Pat. No. 4,584,603 (closed environment entertainment system including subscriber selection and control of program material); Bessler et al, U.S. Pat. No. 4,755,872 (pay for view system for use with cable system having one way addressable converters); Clark et al, U.S. Pat. No. 4,761,684 (telephone selection of video programming for cable television system); Gordon et al, U.S. Pat. No. 4,763,191 (telephone selection of video programming for cable television system); Monslow et al, U.S. Pat. No. 4,995,078 (telephone scheduling of real time video broadcast over a dedicated cable system); Lambert, U.S. Pat. No. 4,381,522 (telephone selection of video programming for viewing on a cable television system in which a directory channel displays program selections and schedules); Goodman et al, U.S. Pat. No. 5,010,399 (video transmission and control over residential phone lines); and Kleinermann, U.S. Pat. No. 4,849,811 (simultaneous transmission of audio and image frames over standard telephone lines).

Thus, while video distribution systems are being developed and the video-on-demand industry proceeds apace, there is little or no effort going into delivering audio programming, even though many people spend two or more hours a day in their automobiles. Accordingly, an improved, easy to use audio program distribution system would find ready acceptance by the public.

SUMMARY OF THE INVENTION

The invention is an audio program distribution system that includes a portable audio recording and playback device which is programmable from a high speed download system, such as a television cable system, satellite, or fiber optic telephone link. One embodiment of the invention uses television cable as a distribution medium, and thus takes advantage of a well known, established, high data rate communication infrastructure.

The portable device consists of the following components: (1) a high-capacity data storage medium, such as a hard disk drive, optical floppy disk drive (floptical), Digital Audio Tape (DAT), flash memory PCMCIA disk emulation card, write once read many compact disk (WORM), or other equally high capacity, high density storage medium; (2) a base control interface for determining and accepting program material; (3) a mobile control interface for displaying the identity of recorded material for playback selection; (4) a recording mechanism for accepting very high speed digital data from an external source, at rates faster than real time; and (5) a playback mechanism for retrieving the stored data from the storage medium and for converting the data into audio signals for playback through an external audio amplifier, such as an automobile radio, via FM or cassette tape modulation, or appropriate personal listening device, such as a Walkman®. Operation of the system is as follows: (1) the subscriber attaches the portable device to a cable television converter and selects a dedicated data exchange channel, e.g. Channel 66, that provides a menu display which includes a catalog of available audio program material; (2) using a two-way feedback selection device, such as the television remote control unit or a touch tone telephone connection to a control center, the subscriber selects the desired audio program material and then authorizes billing to a credit card or other account; (3) high speed data transfer may begin immediately, or it may be deferred as desired (for example, to a time when the television cable is not otherwise in use, e.g. 2:00 A.M.); (4) after data transfer is complete, the portable device may be removed from the base location and taken to a vehicle or other mobile location for playback as desired.

DETAILED DESCRIPTION OF THE INVENTION

The invention allows a subscriber to: (1) select audio program material from a remotely located library; (2) when he wishes to make the selection; (3) receive the material via a variety of communications means at a rate much faster than real time, such that it is not necessary to wait very long to receive the program material; and (4) transport the stored program material to a vehicle or other location for playback in a suitable mechanism; (5) at any desired time. Thus, the invention provides a very rich variety of program material via a wide-band high speed information channel for storage on a subscription and/or on-demand basis available from a much wider range of sources than is currently feasible on cable to the subscriber, and for use when desired. The invention also includes a system that transfers selected program material over a high speed data link at a rate much faster than real time.

Figure 1:
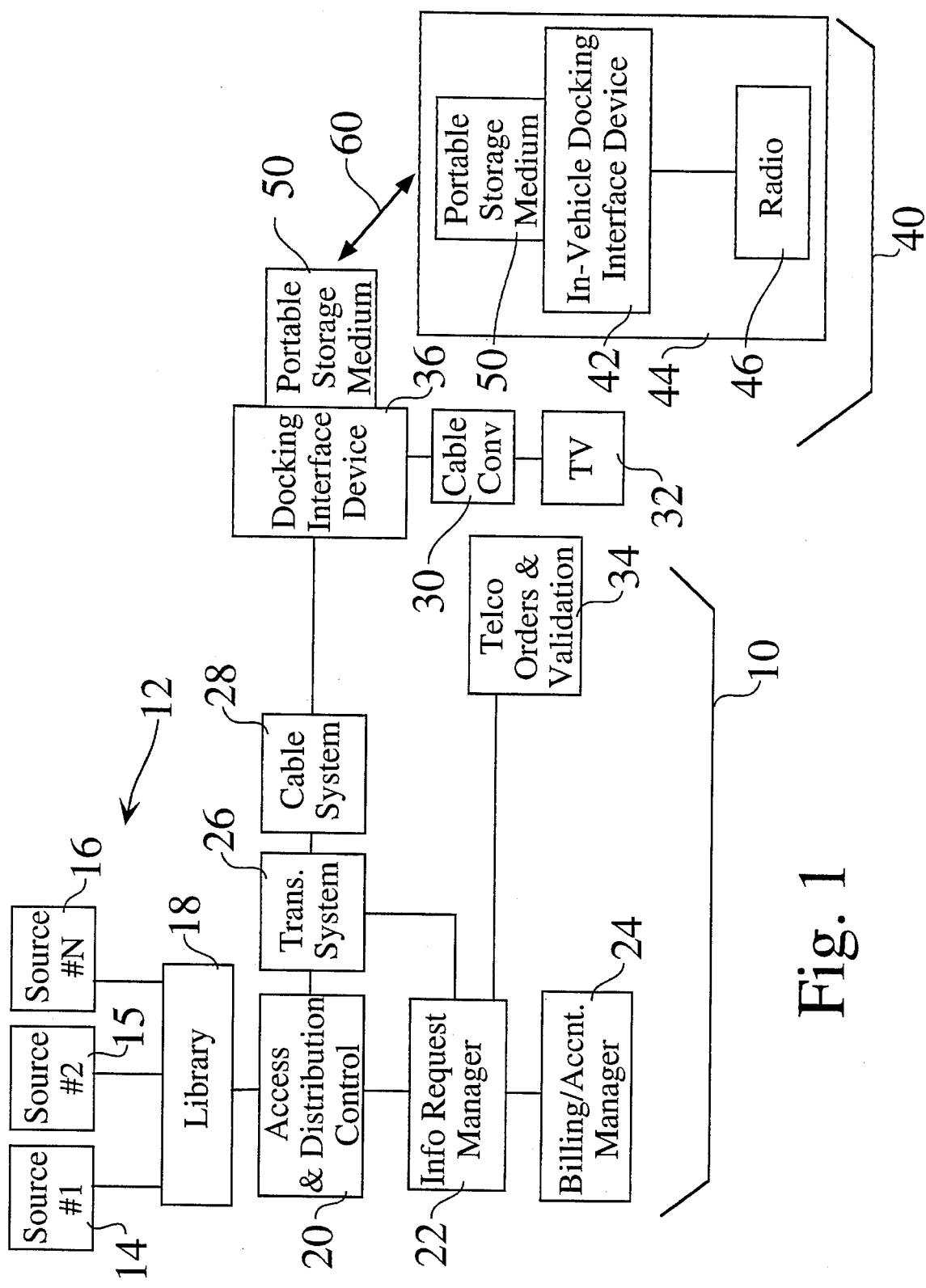
FIG. 1 is a block level schematic diagram of a high capacity, remotely programmable audio storage and playback system according to the invention.

FIG. 1 is a block level schematic diagram of a high capacity, remotely programmable audio storage and playback system according to the present invention.

The system includes a library 18, that contains a plurality of audio program materials stored in a digital format 12. The library may be implemented in any known digital storage technology, for example as a plurality of digital storage media, such as ultra fast hard drives. Program material may be introduced into the library from a variety of sources 14, 15, 16 that may be delivered electronically over a variety of data communications media at high speed from a plurality of locations, for example via modem transfer from a distributor, such as the Wall St. Journal.

It is anticipated that one important use of the invention is as a subscription service. For example, a daily newspaper, such as the Wall St. Journal or the New York Times, may be transcribed each morning into an audio version, that is then digitized and delivered to the library 18. In this way, the library may provide daily delivery of a morning newspaper in audio format that allows a subscriber to listen to the news in a way that the news is not interrupted by commercial breaks and is not truncated to fit into a tight broadcast schedule.

A program distribution system 10 is provided by the invention to enable a subscriber to select desired programs, and to be charged for the service. The program distribution system includes an information request manager 22 that selects a series of stored program materials from the library 18 via an access and distribution control circuit 20. The subscriber is billed for selected program materials by a billing and account manager 24. Program selection may be made over a telephone line, as in shown in the prior art, or it may be made from the subscriber's television 32 and/or a standard interactive cable television converter 30. Orders placed by the subscriber are routed via a cable television system 28, or from residential phone lines via a telephone order and validation module 34, to an input portion of the transmission system 26, from which they are routed internally for scheduling by the information request manager 24.

The actual program material delivery system may be chosen to take advantage of existing regional infrastructure. The invention is well suited for such systems as cable television, interactive cable, pay-per-view, telephone, and satellite distribution. Examples of such distribution vehicles, as well as new and emerging forms of distribution are discussed in D. Deloddere, W. Verbiest, H. Verhille, Interactive Video On Demand, IEEE Communications (May 1994); R. Jones, Baseband and Passband Transport Systems for Interactive Video Service IEEE Communications (May 1994); and P. Baran, Satellite Communications System and Apparatus, U.S. Pat. No. 4,455,651 (19 June 1984).

During data transmission, program materials are transferred from the library at rates faster than those corresponding to real time playback rates for delivery to a series of high speed data transmission systems 26. The broad band high speed data transmission systems are similar to those that are currently used for video program delivery to cable television head ends, except that in the system herein the program material is subsequently delivered in digital high speed format to an individual subscriber's home.

In the exemplary embodiment of the invention, the transmission system 26 routes the selected program material to the subscriber's residence via any known means, such as a cable television system 28. Once received at the subscriber's residence, the standard cable television converter 30 routes the program material to a docking interface device 36.

Alternatively, the cable system 28 may be coupled directly to the docking interface device 36. The cable converter 30 and television set 32 may then be selectively coupled to the cable system 28 via control circuitry in the docking interface device 36.

A portable program storage/playback system 40, provides a specialized set of three interrelated subsystems that together capture the selected audio program material, store the program material, and enable easy transportation of the stored program material to a playback unit located that is elsewhere, for example in a mobile environment, such as an automobile. The three subsystems include a base docking device 36, a portable storage unit 50, and a mobile docking device 44. Once program materials are stored on the portable storage medium 50 as discussed above, the medium is transferred (60) to an interface 42 provided by the mobile docking device 44. The playback system permits the stored program material to be played back in real time, for example over the AM/FM radio 46 in an automobile. Operation of the preferred embodiment of the invention is as follows:

The subscriber attaches the portable storage device 50 to the base docking device 36, to which the cable from a cable TV supplier 28 is either directly connected or is connected from a standard cable television converter 30. The subscriber's cable converter is driven from a splitter port on the base docking unit.

The subscriber selects a dedicated cable channel that displays a menu for controlling the system, and that includes an indexed display of material available to the subscriber from the library 18, as well as various delivery options and transaction costs. The display may be a highly intuitive, graphical user interface, such that the system is easy for the subscriber to use.

The subscriber may use a two-way feedback selection device, such as a television remote control device, to make the desired program material selection. Alternatively, the subscriber may use a touch-tone phone to dial a toll free number, such as an 800 number, and enter program material selections from the telephone keypad, for example when the cable system does not provide a two-way interactive capability. In such instance, the cable system updates the subscriber's display such that choices made by operating the telephone keypad are reflected immediately on the subscriber's display. Thus, the subscriber navigates the display using the telephone keypad in a natural and intuitive fashion. A subscriber may also use a personal computer to access a program scheduling application, e.g. via the INTERNET. Another aspect of the invention stores a user interface image library at the base docking interface device in a ROM or flash EPROM. In this way, a sophisticated graphical user interface is provided without using any transmission time or bandwidth to support the interface.

An automatic counter at the information request manager 10 keeps track of the duration of each selection, and informs the subscriber when the capacity on the particular portable storage device had been reached. It is anticipated that systems having various storage capacities may be offered to subscribers based on the subscriber's needs and ability to pay for such services.

When the subscriber has completed placing the order, a payment icon is displayed that requires the subscriber to authorize billing to his account. The subscriber may request materials on a one-time basis, which for purposes of the invention is referred to as audio on-demand, for example he may want to listen to a symphony; or he may want to receive information on a daily or other periodic basis, which for purposes of the invention is referred to as an audio subscription. These decisions may be made during order placement, and may be canceled or revised at any time by accessing the distribution system.

Once the order process is completed, high speed data transfer may begin, or data transfer may be delayed until a time when the cable television line is not being used to supply television programming, e.g. 2:00 A.M. Such data transfer may take place over the same dedicated cable television channel that is used to place the order, or data transfer may take place over a separate dedicated television cable channel. Alternatively, the subscriber may assign a channel for data transfer. It is not expected that data transfer will affect operation of the normal cable television function, e.g. the subscriber may simultaneously record a late night television program with a cable ready television or a second cable converter, and receive a subscription data transfer with the cable television converter or directly through an internal RF detector/demodulator.

Data transfer does not take more than a short period of time because the data is digitized and is transferred at very fast data rates, e.g. at a 10 Mbit/second data rate, i.e. $10^7$ bits/second, with a 100 Mbyte storage medium, the following amount of data must be transferred:

100 Mbytes=800 Mbits=$8*10^8$ bits.

At a $10_7$ bits/second data transmission rate, it is possible to transfer $8*10^8$ bits in 80 seconds. The actual length of the real time program depends on the sampling rate, the quantizing levels, the compression systems used, the use of packet transmission, and the type of forward error correction employed, as well as cable network latency. Additionally, the system may activate an error correction protocol in the event such forward error correction fails. Thus, the system detects a received error and dials a special retransmission request telephone number, identifying the missing or lost data blocks. The information request manager then resends the missing information.

All of the foregoing parameters may vary considerably according to market requirements, e.g. with regard to quality and end-to-end transmission integrity. An overall time compression ratio of about 100:1 is typical. Based on the foregoing, the system allows a total program length of 8000 seconds, i.e. 133 minutes. The information real time bit rate is about 100 kB/sec, which is adequate for very high quality speech coding. The foregoing discussion is provided for purposes of example only. It is possible to implement the invention using different data rates, bandwidths, storage capacities, sampling rates, compression, coding, and encryption techniques, and total program space.

The total time required to transfer the material to the subscriber is a function of the time it takes to transfer the materials selected by the subscriber from the library, plus the time it takes to transfer the materials to the subscriber at faster-than real time, typically a 10 MB/sec, transmission rate. This may take somewhere between 15 minutes and one hour, using presently available technology. The base docking device may provide a visual or aural indication, such as a beep, when data transfer has been completed. Notwithstanding the example provided above, the state of the art is such that approximately 4–6 or more hours of material may be stored in the portable storage medium. Such medium may be a hard disk drive, a floppy optical drive (floptical), a CD-ROM, a flash memory disk emulation card, e.g. a PCMCIA card, and the like. It is expected that the rapid rate of development in the technology of data storage will produce much larger storage capacities.

For some types of materials, such as speech (typically 50–6000 Hz), the bandwidth of the reproduced signal may be narrower than that of other types of program material, such as music (typically 20–20,000 Hz). Thus, the actual transfer time, and storage time of the portable storage medium, are a function of the type of material transferred. The materials transferred are processed in accordance with many factors, one of which is the speed with which they may be transferred.

The invention allows materials having different bandwidths to be transferred at the same time. In this application, each separate program may be preceded by a header that configures the system for narrow bandwidth or wide bandwidth reproduction. In this way, the invention allows distribution of several types of material at the same time and in the most efficient way possible. Additionally, some materials may be transferred for repeated use, while other materials may be transferred for use one time only. Each program includes a header that not only identifies the bandwidth of the materials, but also identifies the use allocation of the material. Thus, the material may be used once, a predetermined number of times, or as often as desired, based upon the header accompanying the material. Actual use may be assigned as a function of the amount paid by the subscriber. Thus, the subscriber may pay for limited or unlimited use as desired.

It is also anticipated that the subscriber may purchase trial subscriptions that would provide an audition mode, e.g. one in which portions of the materials are periodically deleted. Finally, it is anticipated that some materials may need to be secured. This can be accomplished by use of any known data encryption scheme, such as a public key system (e.g. RSA), where the subscriber's system is registered to the program materials at the time the materials are transferred to the subscriber. In this way, the subscriber may be prevented from sharing or copying the materials without first paying for the right to do so.

At any time after completion of the data transfer, the subscriber may disengage the portable storage module from the base docking station, and take it to a mobile docking station, for example in a vehicle, where it may be listened to as desired.

The various elements of the invention are discussed below in greater detail:

The Library. The library is a storage system that uses high capacity hard drives with at least 10 MB/sec read capabilities. This high read speed enables access and transmission to the subscriber over the transmission system at rates greater than real time, thus saving bandwidth on the transmission system and saving time for the subscriber in obtaining the requested program materials. The library is provided with fresh audio program material on a regular basis. This information may be digitized and compressed, if necessary, i.e. it is not already in a digital and/or compressed format. The sampling rate during digitization should be sufficient to ensure adequate audio quality for speech; a second digitization scheme may also be used to provide adequate audio quality for music.

The sources of program material are only limited by incoming channel capacity and digitizing processors, and by market demand. There may be more than one library facility located at more than one central operations station, or several regional distribution centers may be supported by the system.

Program Selection Manager. The program selection module is a computer-communications system that allows the subscriber to interact with the information request manager, the billing system, and the on-screen display of program material available for subscription. The system is tailored to the needs of the subscriber to allow easy program material selection with minimum time and difficulty. One of the key elements of the program selection module is the incorporation of the program agent, which when invoked by the subscriber, automatically proceeds to instruct the information request manager to download a group of pre-selected program materials. If the subscriber wants to order additional program materials, such selection may be made at any time, either before or after activation of the program agent. The program selection means also drives the automated billing and accounting system that charges the subscriber for the services provided in accordance with a variety of pre-arranged methods.

The foregoing system modules may be implemented by machines, such as computers and/or programmable controllers, for example in software applications having a series of instructions represented on flow charts that define all system states and threads, including recovery from subscriber-initiated mistakes. The exemplary operating equipment required to implement the system herein described consists of one or more fault-tolerant computers operating from uninterruptible power supplies that assure that there is no system down-time due to equipment failure. The data communications equipment required by the system herein described typically consists of a phone bank or private branch exchange (PBX) system for receiving incoming program selection calls from subscribers; and a series of communications data handling equipment, i.e. computers that provide the communications interface from the phone to the information request manager. The data handlers receive subscriber requests, check for validity, and queue the requests for subsequent processing by information request manager.

The Information Request Manager. The information request manager may be implemented in a computer system and application programs that accept incoming requests from the data communications handlers, sort the requests, queue the requests for batch retrieval from the library, and then forward the selected program material to the broadband data transmission system for distribution to the subscriber.

One important element of the system is the use of a real time filtering function by the information request manager to update the library requests. The information request manager sorts the various subscriber program requests into bins to keep track of the number of subscriber requests for each program in the library. Meanwhile, the information request manager fetches a copy of the requested program, queues the program in a fast hard disk drive, and ultimately commands transfer of the program to the broadband transmission system input.

The information request manager uses the bins to keep track of the address of each subscriber who has requested that particular program. When a preset number of requests is reached in each bin, the information request manager activates a transfer routine. The transfer routine first broadcasts a message containing the addresses of those subscriber docking systems that have requested the specific program material. The program material is then sent after the addresses are sent. In other embodiments of the invention, the program material may be broadcast system wide with an identifying header, such that the material is only received and decoded by the requesting subscribers. This implementation of the system is similar to various data network schemes, such as Ethernet.

If sufficient numbers of subscribers request a number of the same programs, the programs may be batched and sent together. The information request manager processes a first set of bins during a prescribed time period. While the information request manager is processing the entire series of bins, additional subscriber program requests continue to be added to the system in real time, at the bottom of the bins. Thus, the information request manager periodically clears its way through all the program counter bins, assuring delivery of selected program material to the subscriber in a reasonable period of time.

Additionally, the information request manager automatically clears the bins of those program materials that are not popular, e.g. those that never have more than 100 requests at any given time, independently of the number of subscribers selecting the program to assure that subscriber requests do not become stale.

For example, assume that a subscriber may choose from ten programs; and that two of the programs are very popular, and are chosen 100 times more often than the least popular program. Therefore, during system peak request hours the bins for the most popular programs fill up 100 times as fast as those for the least popular program. Assume also that all ten programs may be transferred to a subscriber in one minute, not including the time it takes to broadcast the addresses of the subscriber destinations. For purposes of this example, the length of time required to transfer all such programs is defined as a program epoch. At an average transmission rate of 10 MB/second, the program epoch amounts to 600 MB of data. The amount of time to broadcast the destination addresses for the most popular programs, which are broadcast first in any epoch, increases as the number of customers increases, even though the average time required to broadcast the program per customer decreases because it only need be broadcast once for several customers. For this example, each address packet is 100 bytes long, or 800 bits. Thus, the information request manager can broadcast addresses for the two most popular programs to about 125,000 customers in one minute. As successively less requested programs are broadcast, the time it takes to send out the addresses decreases. Accordingly, program materials may be broadcast to thousands of customers in a very short period of time.

The Portable Program Storage/Playback System.

Figure 2:
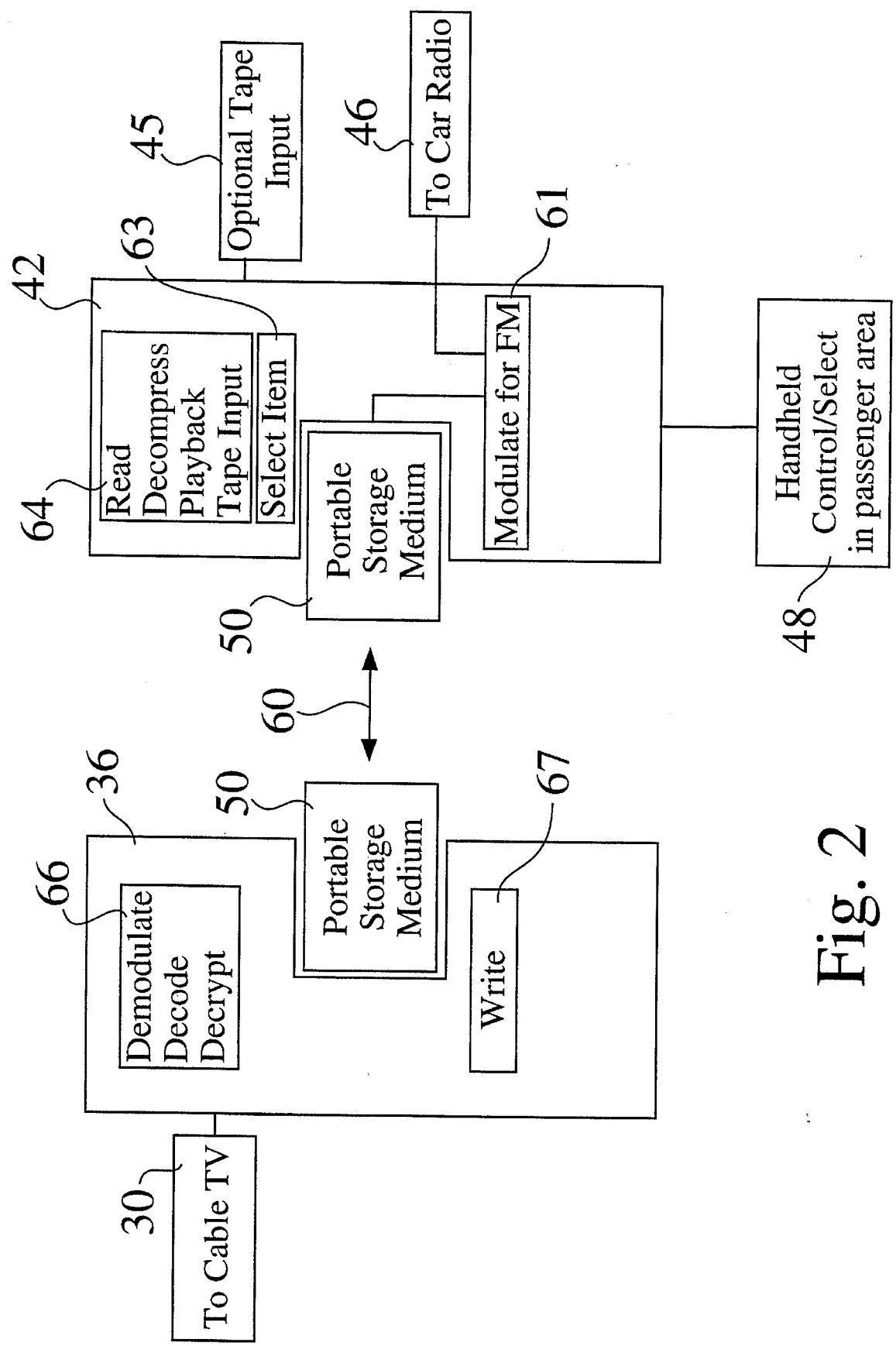
FIG. 2 is a block level schematic diagram of a transportable, high capacity audio storage medium, including base and mobile docking ports according to the invention.

FIG. 2 is a block level schematic diagram of a transportable, high capacity audio storage medium 50, including base 36 and mobile 42 docking ports according to the invention.

The portable storage device consists of the following items: The base docking system 36, the portable storage system 50, and the mobile docking/playback system 42. The base station includes a processor 66 that receives an input program signal from the cable television system 30 and demodulates, decodes, and decrypts the signal as necessary. A write circuit 67 transfers the program material thus prepared to the portable storage medium 50. The write circuit is chosen as appropriate for the portable storage medium, e.g. a disk drive for a hard disk storage medium.

The portable medium is intended for transportable use. Thus, the medium is removed from the base docking station 36 and carried (60) to the mobile docking station 42. In the mobile docking station, a select circuit 63 identifies the contents of the portable storage medium and a processor 64 reads, decompresses the program material, and converts the digital material to analog audio signal that may be used to drive a modulator 61 which, in turn, provides an analog RF signal to the mobile location, e.g. a car radio 46.

Figure 3:
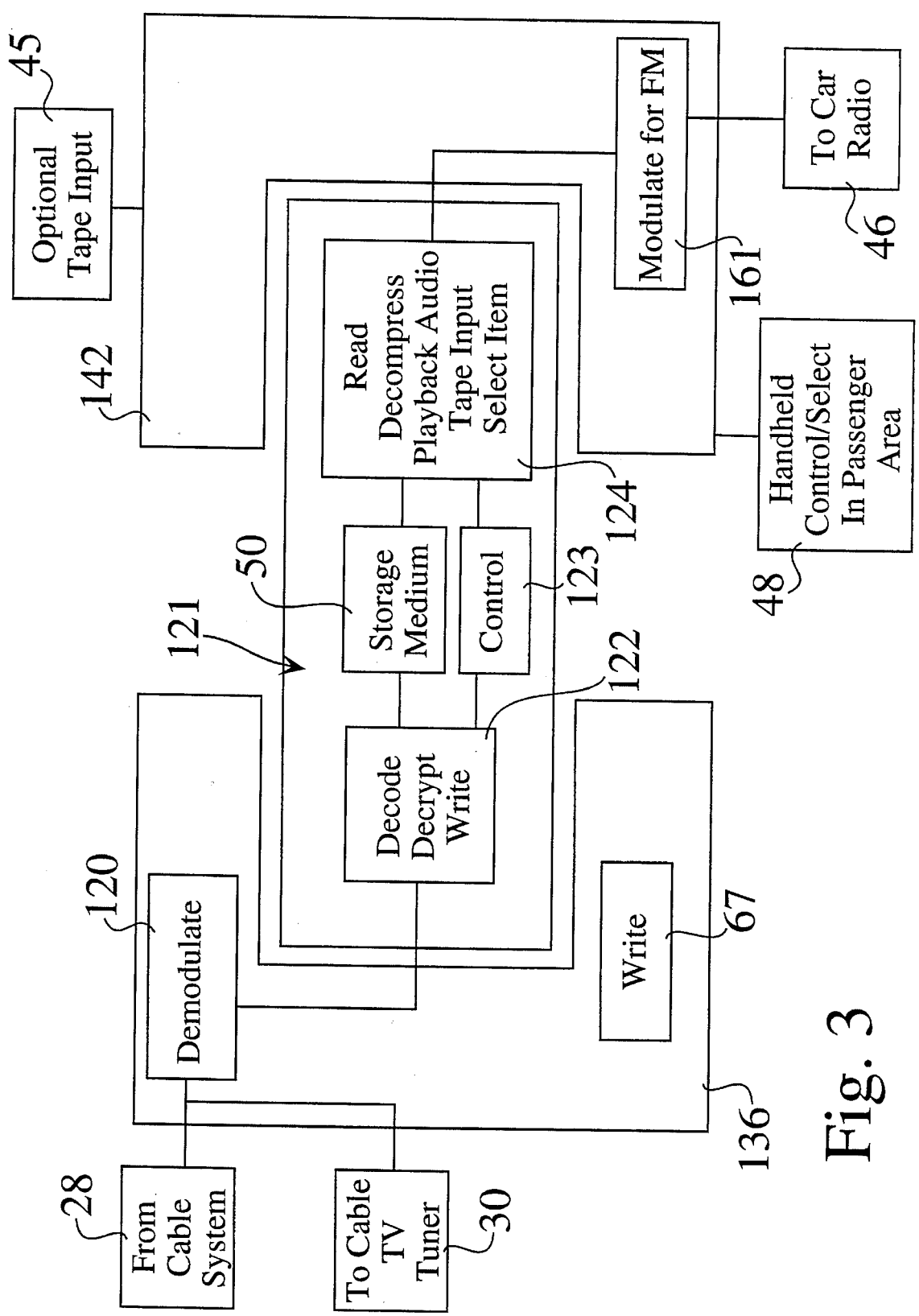
FIG. 3 is a block level schematic diagram of an integrated, transportable, high capacity audio storage and recall device, including base and mobile docking ports according to the invention.

FIG. 3 is a block level schematic diagram of an integrated, transportable, high capacity audio storage and recall device, including base and mobile docking ports according to the invention. This embodiment of the invention differs from that of FIG. 2 in that it incorporates most of the control and signal processing functions in a common package with the storage medium. Thus, the system according to this embodiment of the invention provides a self contained unit that allows a subscriber to listen to selected program materials independently of a mobile docking station, if desired. For example, the system may be used at a beach or while riding a bus or airplane.

The integrated transportable storage and recall device 121 includes a storage medium 50, which may be any known storage device, as discussed above. The program materials are provided via a cable television system 28 and demodulated at the base docking station 136 by a demodulator 120. The demodulated program materials are routed to the device 121 where they are decoded, decrypted, and written to the storage medium by a decode/decrypt/write module 122 under supervision of a control module 123.

The subscriber may listen to the stored program materials in response to subscriber issued commands that instruct a processing module 124 within the device 121 to read the storage medium, decompress the pertinent data contained thereon, and convert the data to audio, such that it is available to the subscriber as an audio signal for reproduction through a personal listening device, such as a set of headphones, or through modulation of a car radio or tape player with a modulator 161, when the device is docked with a mobile docking station 142.

Figure 4:
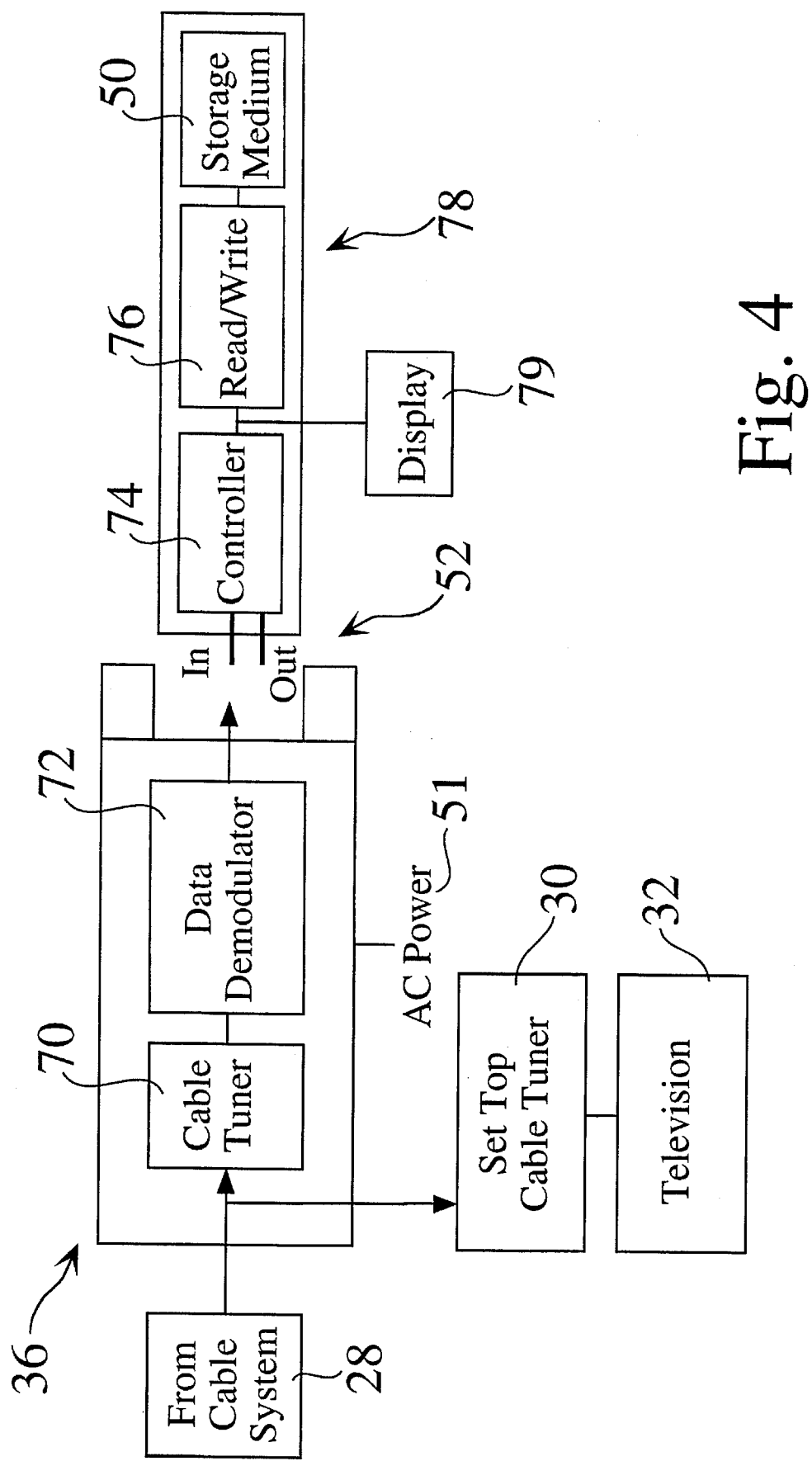
FIG. 4 is a detailed block level schematic diagram showing a transportable, high capacity audio storage medium, including the base docking port of FIGS. 2 and 3, according to the invention.

FIG. 4 is a detailed block level schematic diagram showing a transportable, high capacity audio storage medium, including the base docking port of FIGS. 2 and 3, according to the invention. The base docking system 36 is the transmission system connection point and serves as the conduit for the transfer of data into the portable storage medium 50. The exemplary base docking system includes a cable television tuner (not shown in FIG. 2) that is used to select the desired data channel, e.g. channel 66; a 10 MB/sec or other equally high speed data demodulator 66 that converts the RF signal from the cable system to a digital data stream; an error detection/correction and decryption processor 66 that restores the data stream to its original but still compressed state; a data interface that connects to the physical port that then connects to the portable storage system; and an AC power supply. In addition, there is an RF signal splitter that passes the entire cable signal on to the television converters normally associated with broadcast video reception.

The high speed data demodulator may be realized with a slightly modified, standard Ethernet demodulator. This simple type of demodulation is sufficient because the FCC requires that the carrier-to-noise ratio in a 6 MHz cable channel must be 38 dB or higher, and must be 41 dB in 1995. This signal-to-noise ratio is sufficiently high that very simple error control techniques may be used in the system.

The storage medium is typically part of a portable storage system 78 that consists of the high-capacity data storage medium 50, e.g. a hard drive, Digital Audio Tape [DAT], floptical disk, or other equally high capacity high density low volume media; a control interface 74 that identifies program material; a second control interface 79 that displays the identity of recorded material for selection for playback; and a recording mechanism 76 that accepts very high speed, i e. at rates faster than real time, digital data from an external source. The second control interface may be incorporated into the portable storage system, for example as the control module 123 shown in FIG. 3 and the display module 79 shown in FIG. 4; or it may be part of a mobile docking station, such as the handheld control 48 shown in FIG. 1.

As discussed above in connection with FIGS. 2 and 3, the docking system 42, 142 accepts the portable storage system module and provides a subscriber control interface 48, readout/decompression protocol on a special purpose microprocessor 64, an FM modulator 61,161 for delivering the audio to the automobile's car AM/FM receiver, and a power supply (not shown) connection to power system situated at the mobile site. The system may incorporate a power management system that accepts power from any of a battery, a DC source in the vehicle, and an AC source.

It is anticipated that the storage module described above may be affixed permanently in a mobile location. For example, the module may be mounted in an automobile and configured to receive broadcasts of subscription and on-demand program material at a faster than real time rate via any known broadcast medium, such as standard FM broadcast, in which case the automobile FM radio may be used to receive the information, which is then output to the storage module; or via microwave link, AM broadcast, television broadcast (using television channel bandwidth to transmit a highly compressed audio signal for extremely fast data transfer, e.g. in accordance with the JPEG or MPEG standards), or digital cellular telephone. Additionally, the storage device may be incorporated into the design of the automobile radio. In either event, program materials may be ordered from the mobile station, for example via cellular telephone; or they may be ordered from a base location, as described above.

Figure 5:
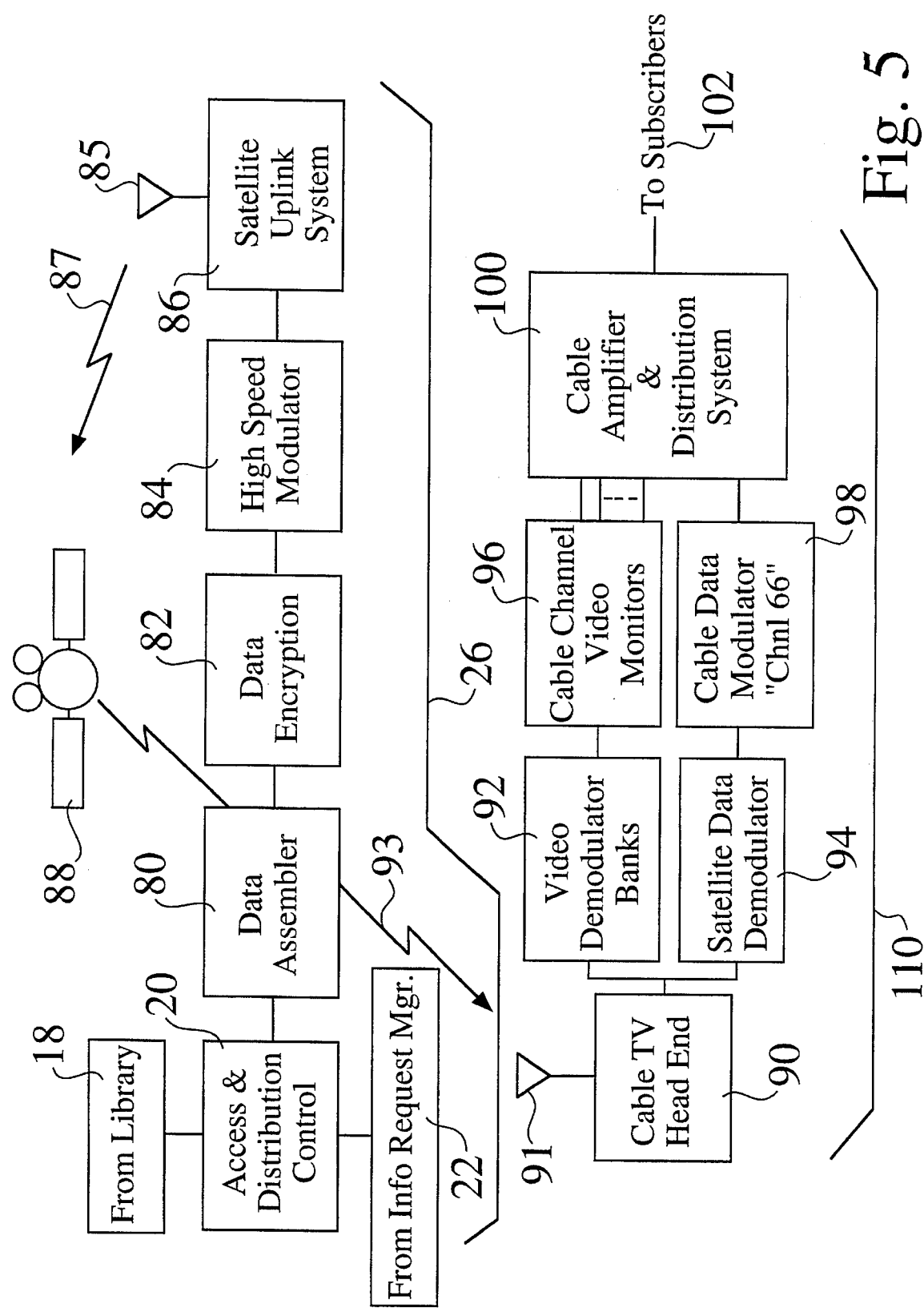
FIG. 5 is a block level schematic diagram of a satellite based high capacity, remotely programmable audio storage and playback system according to the invention.

FIG. 5 is a detailed block level schematic diagram of a transmission and distribution system for a high capacity, remotely programmable audio storage and playback system according to the invention. The transmission system includes a data assembler module 80, a data encryption and error detection and correction module 82, and a high speed modulator 84.

Encryption is important to avoid pirating, and error control is important to avoid the need to retransmit programs that were not successfully received by the subscriber. By applying modern error control techniques, overall bit error rates on the order of better than $1 \times 10^{-6}$ are readily achieved, and on the order of $1 \times 10^{-7}$ are relatively easy to obtain. Audio quality is deemed adequate when the bit error rate is better than $1 \times 10^{-5}$. It is therefore within the state of the art to provide adequate error control over the system end-to-end link.

Program transmission is accomplished by a satellite uplink system 85, 86 that transmits the data to a distribution network, such as to a satellite 88 via a satellite link 87 for retransmission via another satellite link 93 to subscriber remote cable television head ends 90, 91. This process is similar to that for broadcast video for any known satellite distribution system, and is well suited for the latest generation of direct broadcast satellite systems, which provide high data compression rates, e.g. 6 MB/sec, digital systems for video/audio transmission.

At each cable TV satellite receiver head end 90,91, the digital data stream from the information distribution center 18, 20, 22 is demodulated by a demodulator 92, 94 and processed by an error detection/correction system to account for any errors introduced on the satellite link. The still-encrypted data stream is passed to a high speed data modulator 96, 98 suitable for transmission on cable systems 100, 102 where it is converted again to an RF signal for transmission on the cable system. This data stream is passed to the subscriber's home via the normal cable drop system and on to the docking system and then the normal television cable converter system. At the docking system, a high speed data demodulator similar to that used in an Ethernet data network is used to demodulate the signal and produce about a 10 MB/second data stream.

Figure 6:
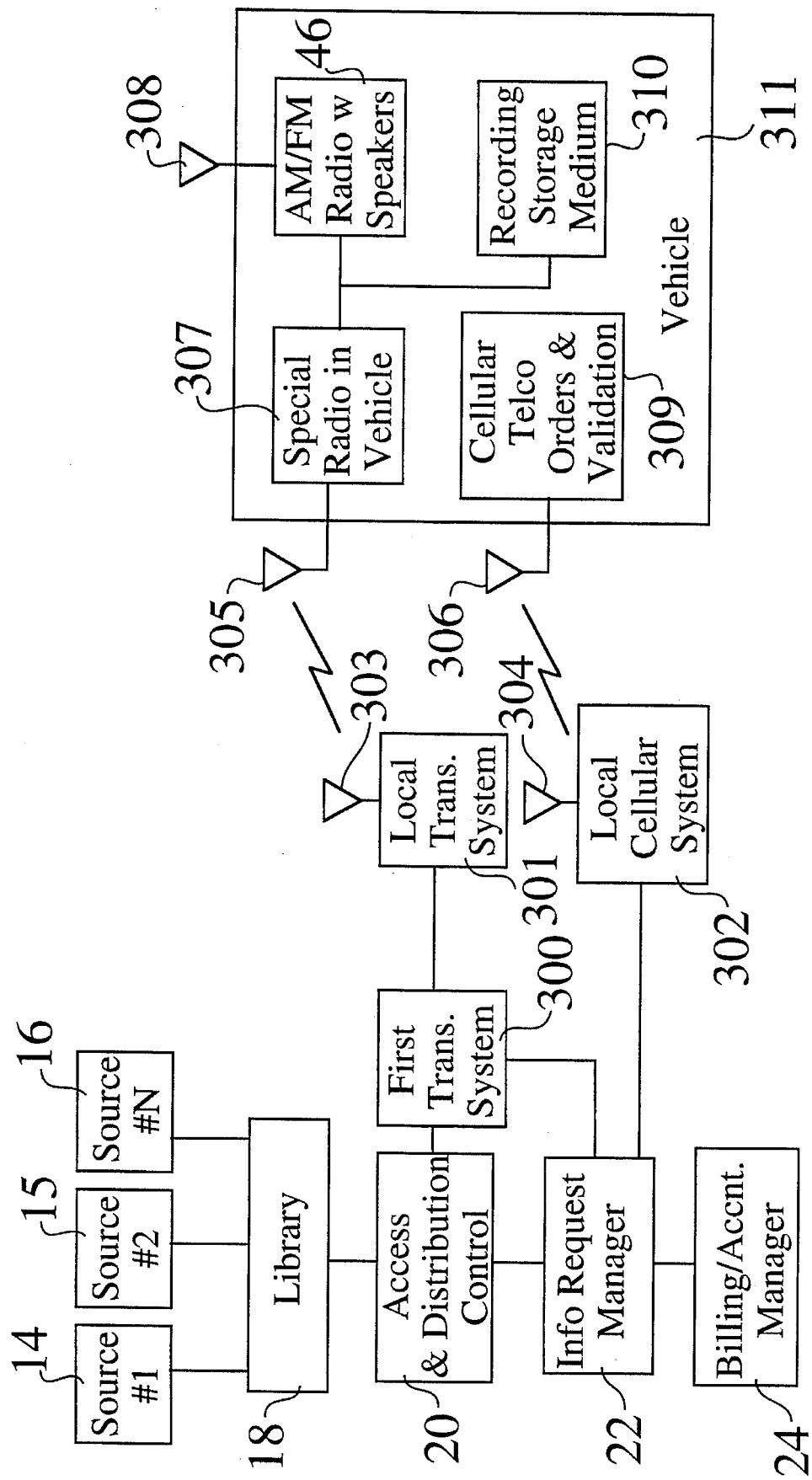
FIG. 6 is a block level schematic diagram of a broadcast based high capacity, remotely programmable audio storage and playback system according to the invention.

FIG. 6 is a block level schematic diagram of a broadcast based high capacity, remotely programmable audio storage and playback system according to the invention. The system of FIG. 6 differs from those described above in that a first transmission system 300 forwards program materials via a local transmission system 301 having an antenna 303 to a vehicle 311 having a receiving antenna 305 coupled to a specially designed radio 307 that is mounted in the vehicle. The special radio receives program materials at any assigned frequency for the subscription service, stores the program materials on a recording storage medium 310, and demodulates and converts the signals to standard AM or FM signals that are used to modulate the standard vehicle radio 46. Alternatively, the special radio may include the standard AM/FM radio function.

In accordance with this embodiment of the invention, orders for program materials may be placed from the vehicle via a cellular ordering system 306,309. The order thus placed are received at the information request manager 22 via a standard cellular system 302. IN this way, a commuter or traveler may order program materials en route, e.g. they may order children's programs when traveling with their children, they may order music, etc.

Figure 7:
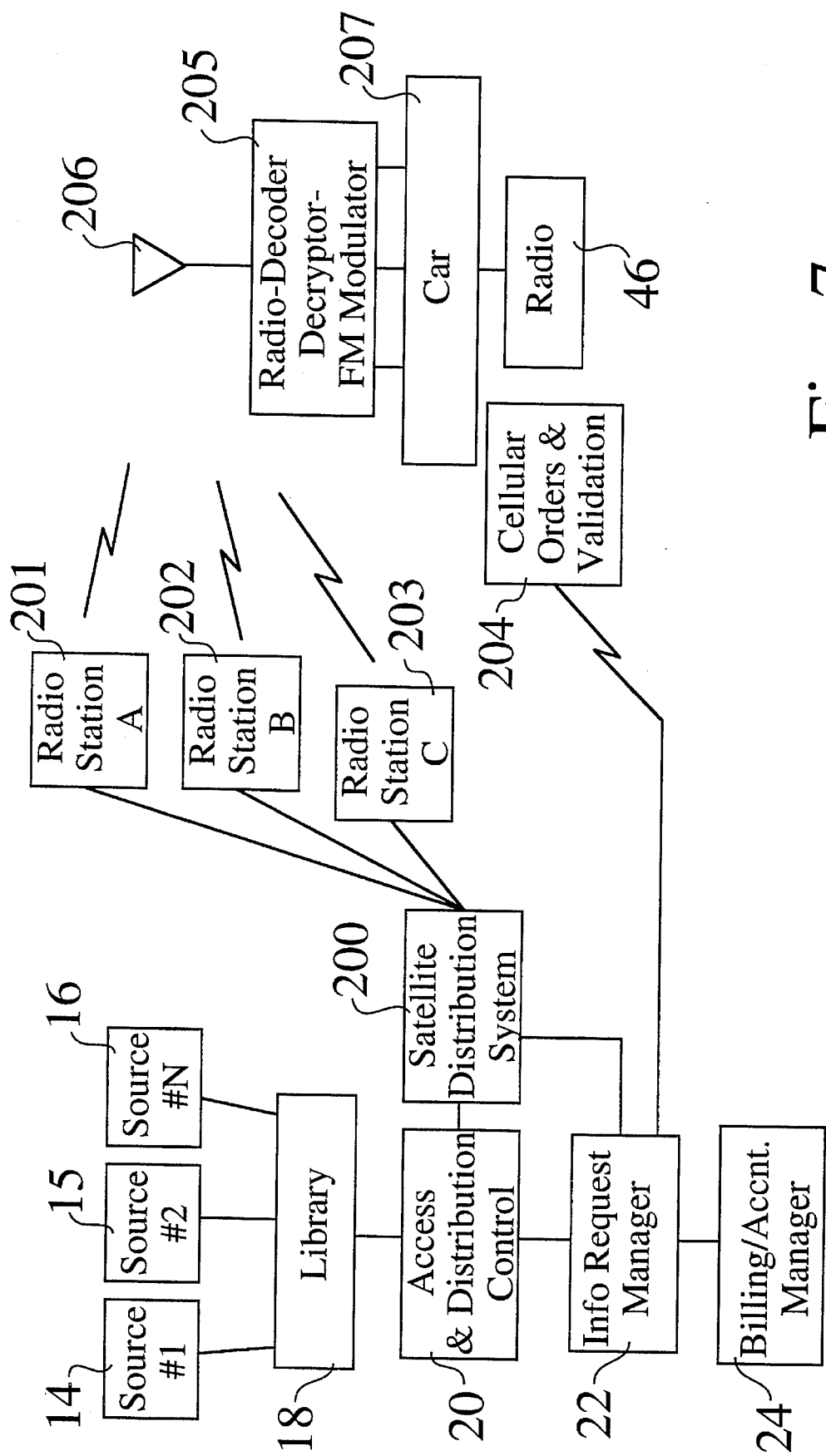
FIG. 7. is a block level schematic diagram of a media-on-demand high capacity, remotely programmable storage and playback system according to the invention.

FIG. 7. is a block level schematic diagram of a media-on-demand high capacity, remotely programmable storage and playback system according to the invention. This embodiment of the invention differs from the foregoing systems in that a satellite distribution system 200 transmits program materials on any of several radio stations 201,202, 203. The program materials are received via a radio decoder 205,206 located in a vehicle 207 or other mobile location. The decoded, decrypted, demodulated signals are then listened to over the vehicle radio 46. As with the system discussed above in connection with FIG. 6, orders may be placed in this embodiment of the invention with a cellular order system 204.

Although the invention is described herein with reference to the preferred embodiment, one skilled in the art will readily appreciate that other applications may be substituted for those set forth herein without departing from the spirit and scope of the present invention. For example, one embodiment of the invention provides a high speed radio-based data link from a data distribution point in the city where the subscriber resides so that the material of choice can be selected in real time and listened to in real time, bypassing the temporary storage medium, unless the subscriber wishes to store the information. Additionally, program materials may be delivered over standard twisted pair telephone lines which are already installed in 200 million homes, and which have the potential of transferring data at the rate of 1.5 MB/sec. Accordingly, the invention should only be limited by the claims included below.

We claim:

1. A system for distributing subscription and on-demand audio programming comprising:

a library containing a pluality of audio program materials stored in a digital format:

a program selection module that allows a subscriber to request program materials contained within said library:

an information request manager that selects program materials chosen by said subscriber from said library and that forwards said selected program material to a data transmission system for distribution to the subscriber at rates faster than real time wherein said information request manager sorts said subscriber library requests into bins to determine the number of subscriber requests for each program in said library, fetches a copy of the requested program, queues the program, and commands transfer of the program to said data transmission system, and wherein said information request manager stores subscriber addresses in said bins to track the subscriber address of each subscriber who has requested a particular program;

and further comprising:

a counter for determining when a preset number of subscriber requests is reached in each bin, such that said information request manager activates a program transfer routine when said preset number is reached.

2. The system of claim 1, wherein said transfer routine first broadcasts a message containing the addresses of those subscribers that have requested specific program material; and wherein the program materials are then transferred after the addresses are sent.

3. A system for distributing subscription and on-demand audio programming, comprising:

a library containing a plurality of audio program materials stored in a digital format;

a program selection module that allows a subscriber to request program materials contained within said library;

an information request manager that selects program materials chosen by said subscriber from said library and that forwards said selected program material to a data transmission system for distribution to the subscriber at rates faster than real time wherein said information request manager sorts said subscriber library requests into bins to determine the number of subscriber requests for each program in said library, fetches a copy of the requested program, queues the program, and commands transfer of the program to said data transmission system, and wherein said information request manager batches and transfers said programs if a preselected number of subscribers request a preselected number of the same programs.

4. A system for distributing subscription and on-demand audio programming, comprising:

a library containing a plurality of audio program materials stored in a digital format;

a program selection module that allows a subscriber to request program materials contained within said library;

an information request manager that selects program materials chosen by said subscriber from said library and that forwards said selected program material to a data transmission system for distribution to the subscriber at rates faster than real time, wherein said information request manager sorts said subscriber library requests into bins to determine the number of subscriber requests for each program in said library, fetches a copy of the requested program, queues the program, and commands transfer of the program to said data transmission system, and wherein said information request manager processes a first set of bins during a prescribed time period; and wherein additional subscriber program requests continue to be added to said bins in real time while said information request manager is processing.

5. A method for distributing subscription and on demand audio programming, comprising the steps of:

storing a plurality of audio program materials in a library in digital format;

allowing a subscriber to request program materials contained within said library;

selecting program materials chosen by said subscriber from said library;

forwarding said selected program material to a data transmission system for distribution to said subscriber at rates faster than real time;

sorting said subscriber library requests into bins to determine the number of subscriber requests for each program in said library:

storing subscriber addresses in said bins to track the subscriber address of each subscriber who has requested a particular program;

determining when a preset number of subscriber requests is reached in each bin;

activating a program transfer routine when said preset number is reached;

fetching a copy of the requested program;

queuing the program; and commanding transfer of the program to said data transmission system.

6. The method of claim 5, further comprising the steps of:

first broadcasting a message containing the addresses of those subscribers that have requested specific program material; and transferring said program materials after the addresses are sent.

7. A method for distributing subscription and on-demand audio programming, comprising the steps of:

storing a plurality of audio program materials in a library in digital format;

allowing a subscriber to request program materials contained within said library;

selecting program materials chosen by said subscriber from said library;

forwarding said selected program material to a data transmission system for distribution to said subscriber at rates faster than real time;

sorting said subscriber library requests into bins to determine of the number of subscriber requests for each program in said library;

fetching a copy of the requested program;

batching and transferring said programs if a preselected number of subscribers request a preselected number of the same programs;

queuing the program; and commanding transfer of the program to said data transmission system.

8. A method for distributing subscription and on-demand audio programming, comprising the steps of:

storing a plurality of audio program materials in a library in digital format;

allowing a subscriber to request program materials contained within said library;

selecting program materials chosen by said subscriber from said library;

forwarding said selected program material to a data transmission system for distribution to said subscriber at rates faster than real time;

sorting said subscriber library requests into bins to determine the number of subscriber requests for each program in said library;

processing a first set of bins during a prescribed time period;

simultaneously continuing to add subscriber program requests to said bins in real time;

fetching a copy of the requested program;

queuing the program; and commanding transfer of the program to said data transmission system.

9. A method for distributing subscription and on-demand audio programming, comprising the steps of:

storing a plurality of audio program materials in a library in digital format;

allowing a subscriber to request program materials contained within said library;

selecting program materials chosen by said subscriber from said library;

forwarding said selected program material to a data transmission system for distribution to said subscriber at rates faster than real time;

sorting said subscriber library requests into bins to determine the number of subscriber requests for each program in said library;

emptying the contents of those bins that receive fewer requests to avoid having program requests contained therein becoming stale;

fetching a copy of the requested program;

queuing the program; and commanding transfer of the program to said data transmission system.

* * * * *